United States Patent [19]

McCarty

[11] 4,131,647

[45] Dec. 26, 1978

[54] DEUTERATED METHYLENE CHLORIDE USED AS A SOLVENT TO REDUCE TOXICITY

[75] Inventor: Leslie P. McCarty, Midland, Mich.

[73] Assignee: The Dow Chemical Company, Midland, Mich.

[21] Appl. No.: 823,575

[22] Filed: Aug. 11, 1977

[51] Int. Cl.$^2$ .......................... B01F 1/00; C23G 5/02
[52] U.S. Cl. ........................................ 424/10; 252/364
[58] Field of Search ........................... 252/364; 424/10

[56] References Cited

PUBLICATIONS

C.A. 85 #187359u, #197411u, #14826r (1976).
C.A. 84 #958c, #13150h, #899j (1976).
C.A. 79 #82937d (1973).
C.A. 70 #50572d (1969).
C.A. 59 #10894e (1963).

Primary Examiner—Shep K. Rose
Attorney, Agent, or Firm—James W. Ambrosius

[57] ABSTRACT

Deuterated methylene chloride is used to replace methylene chloride in a solvent system to reduce the overall toxicity of the composition.

4 Claims, No Drawings

DEUTERATED METHYLENE CHLORIDE USED AS A SOLVENT TO REDUCE TOXICITY

BACKGROUND OF THE INVENTION

Methylene chloride is a colorless, volatile liquid which is widely used as a solvent for various processes including applications in the pharmaceutical and food processing industry. The chemical also is used as a constituent of aerosols and as a blowing agent in the production of foam.

In many of the above-mentioned applications, the user is exposed either through skin contact or inhalation to the methylene chloride. Although methylene chloride is not highly toxic, excessive exposure to the liquid or vapors has been shown to result in an increase in the amount of carboxyhemoglobin present in the blood resulting from the metabolism of the molecule in the body. Therefore, prolonged exposure to the compound may result in a health hazard to users of the chemical.

SUMMARY OF THE INVENTION

The present invention is directed to a method and compositions for reducing the health hazard associated with the exposure of methylene chloride to users or bystanders during applications when it is difficult to control the amount of vapor inhaled or the amount of liquid in contact with the skin. Such applications would include, but are not limited to, use as a volatile component in aerosols, as a paint solvent, as an ingredient in degreasing compositions, as a spotting agent, and as a blowing agent in the production of foam.

The present invention is directed to the replacement of methylene chloride by its deuterated analogue, $CD_2Cl_2$, in applications where there is the possibility of exposure to mammals or man of the vapor or liquid. It has been found that deuterated methylene chloride is less likely to be metabolized by an animal exposed thereto as compared to an animal exposed to methylene chloride. The physical and chemical properties of deuterated methylene chloride are very similar to those of methylene chloride, therefore the deuterated analogue may be used to replace methylene chloride in those compositions which contain methylene chloride and are used in such a way that animals or man may be exposed. Such compositions would be especially useful in consumer products where the compositions may not be used under carefully controlled conditions. Speciality solvents intended for use in small shops would be a further example. Examples of such products have already been listed above and would be formulated using methods well known to the appropriate art. Such solvent compositions usually will contain from about 1% to 95% methylene chloride; generally, the deuterated analogue would simply be substituted for methylene chloride on a volume to volume basis. However, in some situations where exposure of the methylene chloride vapors or liquid to man or animals is minimal only a portion of the methylene chloride may be replaced with the deuterated methylene chloride.

DETAILED DESCRIPTION OF THE INVENTION

The effect of inhaling the vapors of the deuterated material as compared to methylene chloride illustratively was demonstrated in rats as follows:

Deuterated methylene chloride and methylene chloride were vaporized by metering the liquid compounds at a controlled rate in a temperature-regulated vaporization flask held at 120° C. The vapor was swept into the air inlet of a 30 liter glass exposure chamber at a rate of 6 liters/minute. The concentration of the vapors in the exposure chamber was monitored by gas-liquid chromatography using direct gas sampling loops.

Three groups of 9 male Sprague-Dawley rats (8 months of age, 200–300 grams) were exposed to room air, methylene chloride 0.05% v/v and deuterated methylene chloride 0.05% v/v, respectively for a period of three hours. Following exposure, each animal was anesthetized with methoxyflurane, and 5 cc of blood was collected via cardiac puncture. Sequester-Sol ® (Cambridge Chemical Products, Inc.) 0.1 ml was added to the blood sample as an anti-coagulant. Carboxyhemoglobin readings were made using an IL 182 Co-oximeter ® (Instrumentation Laboratory, Inc.). The diluent supplied for use with the Co-oximeter ® was modified for use with rat blood by adjusting the pH to 1.64 using 1 N HCl.

The comparative carboxyhemoglobin levels of the three groups of animals were as follows:

| | |
|---|---|
| Control (Room Air Only) | 0.0% carboxyhemoglobin |
| Methylene Chloride | 6.2% ± 1.3 carboxyhemoglobin |
| Deuterated Methylene Chloride | 1.8% ± 0.5 carboxyhemoglobin |

Statistical differences between the above values were found to be significant at $p < 0.001$. The instrument was calibrated to read zero percent carboxyhemoglobin on the control rat blood, therefore the values do not represent absolute amounts of carboxyhemoglobin present. The results indicate inhalation of the deuterated methylene chloride resulted in significantly lower carboxyhemoglobin contents in the blood of exposed rats as compared to rats exposed to methylene chloride.

Examples of specific embodiments of the present invention are illustrated below to further clarify the invention as already outlined above but such examples are not to be construed as a limitation on the scope of the invention.

EXAMPLE 1

Formulation for a paint remover suitable for application to a surface by a brush.

| | |
|---|---|
| Deuterated Methylene Chloride | 75 Gallons |
| Toluene | 3 Gallons |
| Paraffin | 16 Pounds |
| Methocel[R] (Dow Chemical Co.) | 12 Pounds |
| Methanol | 12 Gallons |
| Mineral Spirits | 10 Gallons |
| Total Volume (Approximately) | 103 Gallons |

EXAMPLE 2

The following is a formulation for a yellow spray enamel.

| | | |
|---|---|---|
| Non-Volatile | 12.8% | |
| Hansa Yellow | | 1.4% |
| Titanium Dioxide | | 1.5% |
| Vinyl Toluene Linseed Oil Copolymer | | 9.9% |

| Volatile | 87.2% | |
|---|---|---|
| Aromatic Hydrocarbons | | 10.0% |
| Aliphatic Hydrocarbons | | 12.2% |
| Deuterated Methylene Chloride | | 35.0% |
| Propane-Isobutane Propellant | | 30.0% |
| | | 100.0% |

EXAMPLE 3

The following is a formulation for an aluminum, 10-minute dry spray enamel.

| Non-Volatile | 10.7% | |
|---|---|---|
| Aluminum Powder | | 2.0% |
| Cumarone Indene Resin | | 6.8% |
| Chlorinated Paraffin | | 1.9% |

| Volatile | 89.3% | |
|---|---|---|
| Aromatic Hydrocarbons | | 2.8% |
| Aliphatic Hydrocarbons | | 23.5% |
| Deuterated Methylene Chloride | | 33.0% |
| Propane-Isobutane Propellant | | 30.0% |
| | | 100.0% |

I claim:

1. In a solvent composition comprising methylene chloride for applications where mammals can be exposed to said methylene chloride in liquid or vapor form, the improvement which comprises replacing at least a portion of said methylene chloride with deuterated methylene chloride.

2. The improved composition of claim 1 wherein the methylene chloride is replaced on a volume to volume basis with said deuterated methylene chloride.

3. A method for controlling the amount of carboxyhemoglobin present in the blood of a mammal caused by exposure to a solvent composition comprising methylene chloride which comprises replacing at least a portion of said methylene chloride in said composition with deuterated methylene chloride.

4. Method as in claim 3 wherein methylene chloride is replaced on a volume to volume basis with said deuterated methylene chloride.

* * * * *